March 4, 1958     A. E. KELLEY     2,825,269
CAM ACTUATED THREAD CUTTING MACHINE
Filed Jan. 7, 1955     4 Sheets-Sheet 1

INVENTOR.
ALVIE E. KELLEY
BY
HIS ATTORNEY

March 4, 1958  A. E. KELLEY  2,825,269
CAM ACTUATED THREAD CUTTING MACHINE
Filed Jan. 7, 1955  4 Sheets-Sheet 2

INVENTOR.
ALVIE E. KELLEY
BY
HIS ATTORNEY

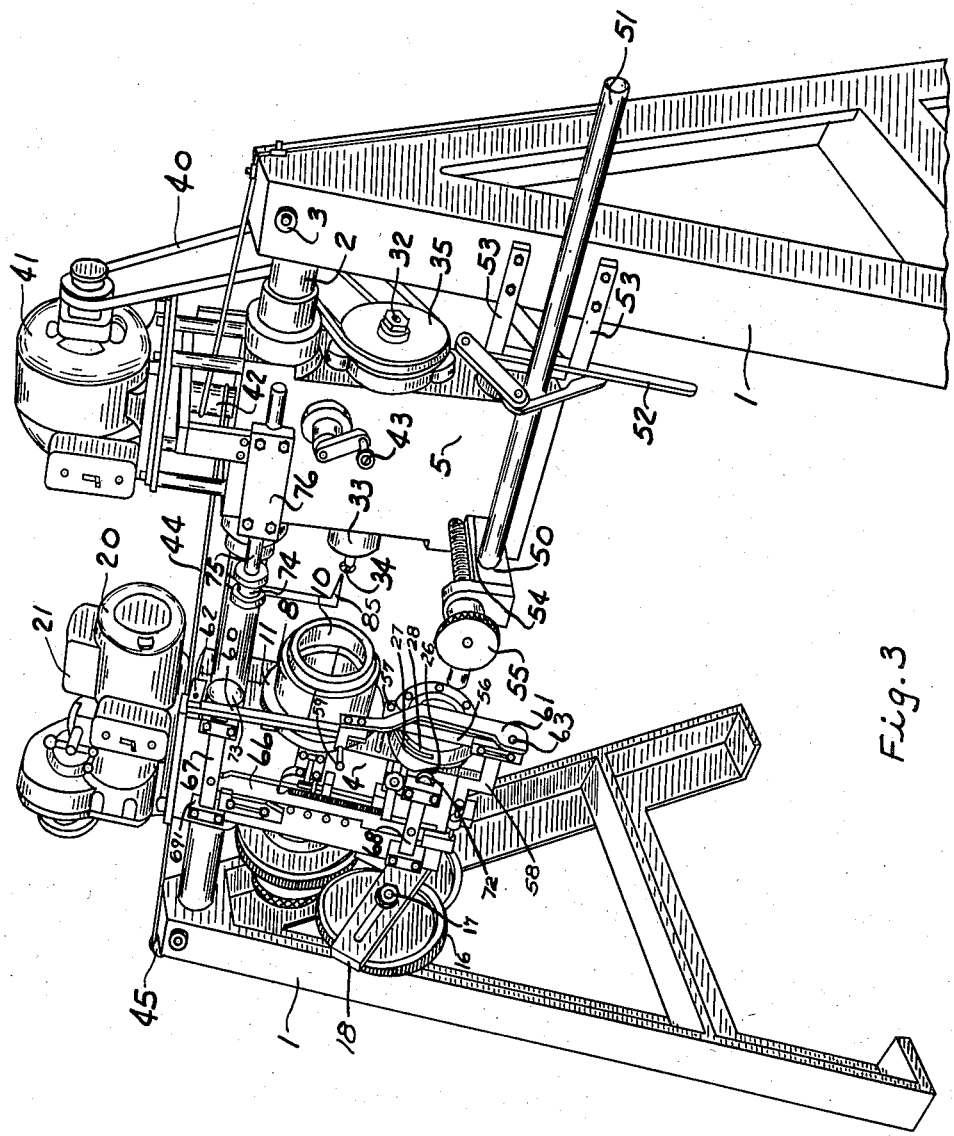

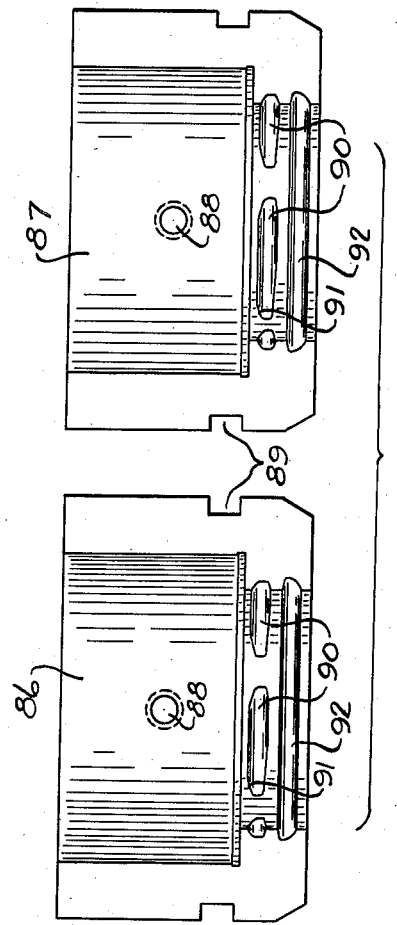

United States Patent Office 2,825,269
Patented Mar. 4, 1958

2,825,269

CAM ACTUATED THREAD CUTTING MACHINE

Alvie E. Kelley, Washington, Pa., assignor to Kelley Industries, Inc., Eightyfour, Pa., a corporation of Pennsylvania Application January 7, 1955, Serial No. 480,372

9 Claims. (Cl. 90—11.64)

This invention relates generally to thread cutting machines and more particularly to a machine for cutting threads of different sizes and pitch, yet guided by a fixed cam surface.

Threading machines are usually controlled by a screw feed. A screw feed is in effect an inclined path wrapped around a cylinder to form a helix which is not a cam and does not lend itself to flexibility when adapted to a machine as does an ordinary cam. The cam employed to guide the thread cutter comprising this invention is an annular cam having its variable cam surface disposed axially of a rotary shaft. It may be a groove in a cylinder or an annular surface exposed on the end of the cylinder. By employing a cam of this type any part or the whole of the cam surface may be employed in operating the machine. This structure provides simplicity in the machine and its operation.

A single or fixed cam surface may be used to guide the cutting path in forming threads of different pitch by the use of a proportion bar that is pivoted at its end to slides, one of which engages the cam and the other is effective to move the cutter axially. By this proportioning bar one can vary the movement of the cutter relative to a fixed change in the cam surface by changing the pivotal center of the proportion bar. The full throw of the cam may thus be made in any specific pitch of the thread to be cut and by changing the relative rotary speed of the cam and the work, any desired thread of predetermined pitch may be produced for a single cam. By using a pressure biased cutter follower, full play due to clearances required in screw feeds are eliminated and more accurate thread cutting may be accomplished with the machine comprising this invention.

By permitting the cutter to swing, the weight of the swinging body determines the cutting force which may be supplemented by a weight or spring as a biasing pressure. The swinging body carrying the cutter may be raised to withdraw the cutter from the work piece. This action is also employed to enter the cutter into the workpiece. If the start, end, or interrupted thread is to be a gradual slope, radial cams having the proper slope may be employed to gradually feed the cutter in or out of the work.

If a circular rib or groove is to be cut on the workpiece, the proportioned bar may be locked out thus permitting the cutter to cut in a circular path rather than along a helix. The full depth of the cut may be determined by a feed screw which locates the cutter relative to a swing rest of the cutting mechanism. Any lift out from this position pulls the cutter out, cutting contact. Radial cams may be adjusted to rise above this swing rest and thus function to engage the rest and thus raising the tool from cutting position.

When the workpiece is sectional or in parts, such as a partable neck mold for a glass pressing and blowing machine, it is sometimes desirable to interrupt the thread at the joint between the mold halves. This is easily accomplished by the use of a jumpover lever mechanism pivoted to the machine. As the chuck rotates the work, an abutment trip pin strikes the lever to raise the same. The lever in turn raises the cutter mechanism out of cutting position.

This structure provides many advantages over that of an ordinary lathe adapted to cut these neck molds. This mechanism will cut a neck mold in a materially shorter time than other mold cutting machines, and it is relatively simple to set up or change as compared to other machines for doing similar work.

Other objects and advantages appear hereinafter in the following description and claims.

The accompanying drawings show for the purpose of exemplification without limiting the invention or claims thereto certain practical embodiments illustrating the principles of this invention wherein:

Fig. 3 is a perspective view showing the cutter backed off from a finished split neck mold.

Fig. 4 is an exploded view of a split neck mold having a thread chased therein.

Figure 1:
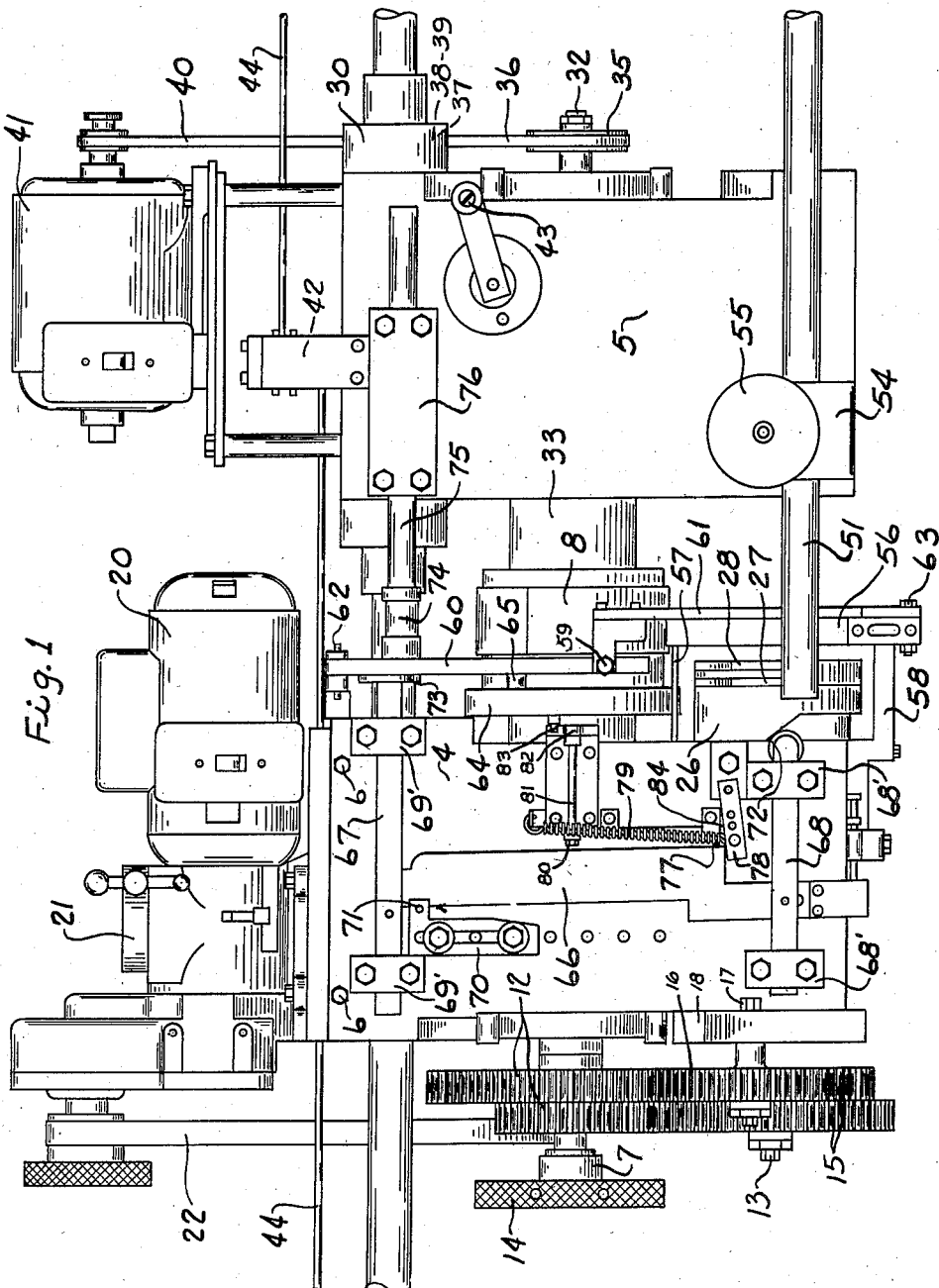
Fig. 1 is a view in front elevation of the machine with the cutter in operating position.

Referring to the drawings, the base or support for the machine is novel for machines of this character and is in the form of a pair of spaced A frame castings 1 having secured in the base of the solid apices a heavy cylindrical frame bar 2. The top of each A frame is split to the bore to clamp the bar by the bolts 3 to make this base or support secure.

Two similar frames or housings 4 and 5 are provided with bores to receive the bar 2. The bore of the housing 4 is also split and is provided with clamping bolts 6 to hold it securely on the bar in a fixed position and preferably at an angle to the vertical as shown.

The housing 4 carries the work spindle 7 which lies journaled in the housing parallel to the frame bar 2. One end of the work spindle carries the chuck or collet 8 in which the workpiece 10 is clamped. This collet is mounted on the head 11 on the end of the spindle 7.

The opposite end of the spindle 7 carries several gears in the gear group 12 which may form part of the train of gears to drive the spindle 7 and also function as an intermediate drive for the spindle 13 which is journaled below the spindle 7 in the housing 4. Beyond the gears 12 the spindle 7 is provided with the collet operating hand wheel 14. Spindle 13 is the cam spindle and has mounted on one end the gear group 15 which meshes with the gear group 12. The spindles 7 and 13 may require the intermediate gears 16 on the stub shaft 17 carried by the bracket 18 to properly drive the spindles in timed relation relative to each other. Both spindles 7 and 13 are driven by the motor 20 mounted on top of the housing 4 and which operates through the gear reducer 21 to the drive belt 22 to the pulley 23 on the intermediate drive shaft 24 carrying the gear 25 which meshes with the selected gear 12 on the spindle 7. Thus by controlling the variable speed device and interchanging the gear, both the spindles 7 and 13 may be driven at selected speeds and in timed relation to each other by employing selected gears of the gear groups 12 and 15.

Spindle 13 is the cam spindle. It has attached thereto the axial cam 26 and the two radial cams 27 and 28. These cams are each formed through 360° but only a portion of their surfaces need be employed to actuate this machine under predetermined conditions. The axial cam 26 is the spiral threading cam that feeds the cutter axially while the workpiece is rotated to produce a spiral cut. The cams 27 and 28 are "let-in" and "lift-out" cams, one letting the cutter feed into the work and the other feeding the cutter out of the work by engaging a contact bar described hereinafter.

Each of these cams 26, 27 and 28 may be independently set on the spindle 13 so that their cam surfaces are effective to perform their separate functions at different time periods relative to each other and relative to the workpiece.

The housing 5 has a bearing 30 at its upper end on the frame bar 2 so that it will be free to swing on said bar and can be moved axially with little force. This housing 5 carries the cutter spindle and when the housing is guided to move axially or swing laterally of the frame bar 2, it moves the cutter along these guided paths relative to the workpiece which merely rotates to perform work thereon.

The cutter spindle 32 is journaled in the housing 5 in substantially axial alignment with the work spindle 7 of the housing 4 which is obvious from Fig. 3. The inner end of the spindle 32 has the chuck 33 carrying the rotary tool 34. The other end of the spindle 32 carries the pulley 35 which is conected by the belt 36 to the intermediate pulley 37 on the jack shaft 38 which has the pulley 39 connected by the belt 40 to the motor 41 mounted on top of the housing 5. The belts 36 and 40, together with their associated pulleys in this cutter drive, are employed to pass around the frame bar 2 and also to provide the proper speed to the cutter. By means of these two tandem belt connections the speed from the motor to the cutter may be increased, decreased, or remain the same. Thus the two motor drives for the work and the tool are mounted on their separate housings above the work and any swinging movement or axial movement of the housing 5 will not interrupt or otherwise change the speed or drive of the tool.

A rotary drum 42 is mounted on top of the housing 5 and is actuated through a work drive by the hand crank 43 on the face of the housing 5. The drum 42 has the cable 44 secured thereto and which is wrapped around the drum and passes over the housing 4 to the pulley 45 and down through the bracket 46 and the spring 47 to the head 48 on the lower end of the spring thus compressing the spring between the bracket 46 and the head 48. When a part of the housing 5 engages a part of the housing 4, the tighter the cable is drawn and the more the spring 47 is compressed. The spring is a bias to urge the housing 5 toward the housing 4. The spring pressure is adjusted to permit the axial cam 26 to move the housing 5 back and forth along the frame bar 2. The cable 44 merely wraps around the drum 42 to be locked thereon and continues to the other supporting A frame. By rotating the crank 43 in the opposite direction the housing will be moved toward the opposite end of the stand. Thus the cable 44 functions as a manual feed for moving the housing 5 in either direction.

The housing 5 carries the slide 50 that passes therethrough and has a hole therein to receive the contact bar 51. The contact bar 51 is a long bar disposed parallel with the bar 2 and is arranged to engage the right A frame 1 regardless of the position of the housing 5 along the bar 2. A manual lever 52, which is biased to swing down by the spring 49, said lever is pivotally supported by brackets 53 secured to the A frame, will lift the contact bar 51 from engagement with the A frame and lock it out of such engagement when the lever 52 is manually raised from the position shown in Figs. 1 and 2 and is placed on the bracket 53.

The slide 50 is mounted on a guide 54 made integral with the housing 5. A feed screw 55 threadably engages the slide 50 and is journaled on the housing. Thus any movement of the feed screw swings the housing 5 laterally relative to the bar 51, and any movement of the bar 51 relative to the A frame swings the housing 5 through this feed screw connection. When the lever 52 is pulled to raise the bar 51 the housing 5 comes with it.

Figure 2:
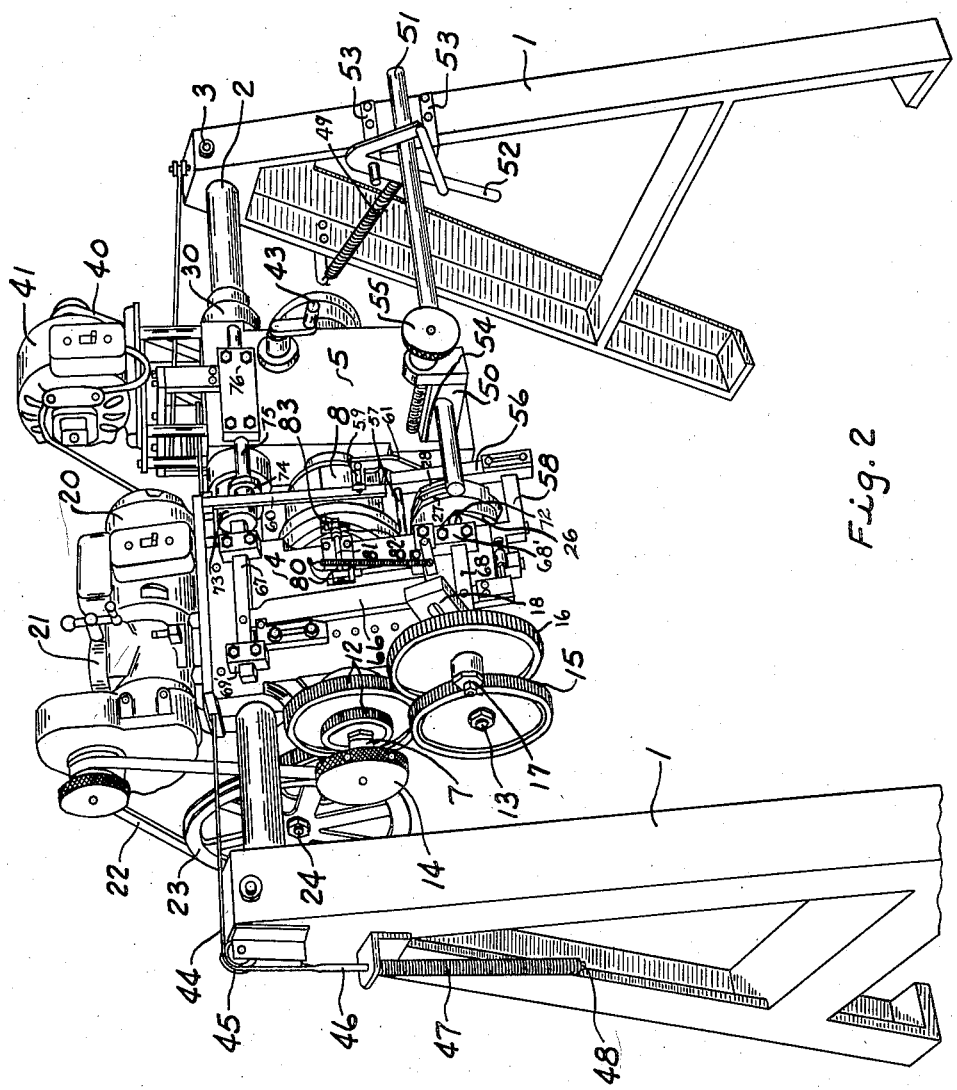
Fig. 2 is a perspective view of the structure shown in Fig. 1.

When the housing 5 is in threading position as shown in Figs. 1 and 2 the lift end of the bar 51 extends over the stationary contact plate 56 which is adjustably mounted on the housing 4 so as to engage the bar 51 in its lowermost position when not in engagement with the cams 27 and 28. This stationary plate should be adjusted to hold the bar 51 out of engagement with the A frame and the lever 52 when the latter is retracted. The stationary contact plate 56 is held at one end by the eccentric shaft 57 and at its other end by the bracket 58 from the housings by adjustment at either end of the plate 56. It may be raised or lowered relative to the housing 4 and the cams 27 and 28 carried thereby. The cam spindle 13 rotates the cams 27 and 28, which are independently set to let in and lift out the housing 5 by their engagement with the contact bar 51 and thus swing the cutter 34 accordingly. The stationary bar 56 functions as the limit of the inward feed of the cutter 34 on the workpiece after the feed screw 55 has been adjusted to determine through the slide 50 the relative position of the contact bar 51 and the housing 5 that carries the cutter 34.

A jumpover lever is provided in two parts 60 and 61. The upper part 60 is hinged at 62 to the housing 4 and extends down across the chuck to adjacent the stationary contact plate 56. The lower part 61 is hinged at 63 to the lower end of the contact plate 56 and the free end of the lower part 61 engages on top of the free end of the upper part 60 through an adjustable screw 59. A jumpover ring 64 is mounted on the chuck 8 and is provided with two or more jumpout pins 65 that are located to correspond with the splits in the partable workpiece. As the spindle 7 rotates, the pins 65 on the ring 64 engage the upper lever 60 and raises it thus raising the lower lever 61 which in turn lifts the bar 51 off the stationary contact plate 56 and thus lifts the tool from the workpiece. If the workpiece does not have any splits or if no jumpouts are needed, the pins 65 may be removed from the ring 64 and the jumpout levers are then ineffectual. The lower lever 61 is below the stationary contact plate 56. This structure may be used on a non-partable workpiece where it is desired to have a jumpout or interruption in the thread being cut. Thus two cams 27 and 28 and a set of pins 65 perform a similar function of swinging the freely movable housing 5 laterally to control the lateral movement of the cutter.

To control the longitudinal movement of the freely sliding housing 5 and the cutter 34 carried thereby, the clamped housing 4 has mounted on its face a proportion bar 66. The bar itself is not fastened but its ends are held in sockets in the upper and lower non-round slides 67 and 68 that are guided for longitudinal movement by the block bearings 69' and 68' respectively. The housing 4 has adjustably mounted thereon the pivot block 70. A series of spaced holes are provided in the housing 4 to receive the pivot block 7. This pivot block carries the fulcrum 71 which bears against the side edge of the bar 66 and, depending upon the position of this fulcrum 71, the proportion bar 66 provides different proportions or lever arms controlling the relative movement of the upper and lower slides 67 and 68 with respect to each other.

The lower slide 68 has fixed on its end the follower roller 72 which engages the cam 26 and is moved by the cam as the latter rotates.

The upper slide 67 has a push head 73 that is engaged by a similar head 74 on the end of the adjustable push bar 75 adjustably clamped by the plate 76 on the housing 5. Thus the head of the push bar 75 engages the head on the upper slide and the crank 43 is wound to take up the spring 47 and cause a constant pressure on the housing 5 making it biased to maintain contact between the heads 73 and 74 and to move back and forth on the frame bar 2 in response to the variations of the cam 26 operating through the slides and proportion bar.

In order to cut a circular groove in the workpiece the proportion bar 66 must be made ineffective by holding the cam follower roller 72 out of engagement with the cam 26. It will be noted from Fig. 1 that the proportion bar 66 has an offset or shoulder 77 which may be engaged by the end of the pivoted latch 78 that is biased move upwardly by the spring 79. The latch 78 is held down by a stem 80' slidably mounted on the housing 4 and is raised by a crank link 80 on the shaft 81, the other end of which has the star wheel 82 engageable by the rotating latch trip pin 83 mounted on the rotating chuck to engage the star wheel 82. When set to operate, the pin 83 on the rotary chuck 8 strikes the star wheel 82 each revolution of the chuck and the star wheel in turn rotates the shaft 81 and the crank link 80 on the end of the shaft 81 raises the stem 80' leaving the latch 78 free to raise under the force of the spring 79 if cleared by the corner of the shoulder 77 on the proportion bar 66. The latch 78, if released by the crank link 80, will not engage and hold the proportion bar 66 out of position until this bar is moved by the cam 26 to that position which permits the latch to swing upwardly and engage on the shoulder 77. A locking trip 84 on this control prevents the latch from functioning by holding the latch 78 down as shown in Fig. 1. However, with this latch trip pin control the proportion bar may be made inoperative at predetermined rotary positions of the chucks, intermediate the formation of the threads cutting the circular grooves or for the purpose of providing circular shoulders on the mold.

A centering gauge 85 is provided for the machine. This gauge is mountable on the frame bar 2 and may be swung to gauge the exact center of the rotary cutting tool or other tool employed. It may also be used for centering the work in the chuck.

As shown in Fig. 4 the mold halves 86 and 87 of the split mold have threaded holes 88 with which to mount the mold halves on the machine. An external annular slot 89 is engaged by the jaws of the mold actuating arms to firmly grasp each mold half.

As shown, each mold half has an interrupted thread 90 made in four sections. Each thread section in this instance is a duplicate of each other and they start at the same relative axial position and are uniformly positioned about the mold halves. One end of each thread section has an increased taper as shown at 91. This is made by the cutter being shaped so that it properly forms this taper when it is slowly fed into the work by the feed action cam 27. However, at the end of the cut the lift out cam 28 brings the tool out rapidly and thus prevents the formation of a long taper at that end of the thread section.

Below the thread sections the mold halves have an annular groove 92 which actually forms the annular bead above the shoulder of the jar to be molded. The shoulder of the jar is formed in the body blow mold which is not a part of the neck mold but is mounted closely adjacent thereto.

I claim:

1. A thread cutting machine comprising a base, a rotary driven work holding spindle carried on said base, a rotary cam spindle carried on said base, gear means interconnecting said spindles to drive the cam spindle in timed relation to the work spindle, cam means on said cam spindle, a slide having a roller engaging said cam means and carried on guides on said base, a pivot means on said base extending parallel to the axis of said work carrying spindle and spaced therefrom, a housing mounted to swing and move axially along said pivot means, a rotary cutter mounted on said housing to engage a workpiece on said work spindle, a second slide carried on guides on said base to engage and move said housing axially of said pivot means, pressure biased means to maintain said housing against said second slide, a proportional bar having its ends pivotally connected to said first and second slides to transmit the action of said cam means to said housing, and fulcrum means positioned on said base to engage said proportional bar and axially slide said housing along said pivot means to guide said cutter in producing a thread of predetermined pitch on said workpiece.

2. A thread cutting machine comprising a base, a rotary driven work holding spindle carried on said base, a rotary cam spindle carried on said base, gear means interconnecting said spindles to drive the cam spindle in timed relation to the work spindle, cam means on said cam spindle, a slide having a roller engaging said cam means and carried on guides on said base, a pivot means on said base extending parallel to the axis of said work carrying spindle and spaced therefrom, a housing mounted to swing and move axially along said pivot means, a rotary cutter mounted on said housing to engage a workpiece on said work spindle, a second slide carried on guides on said base to engage and move said housing, pressure biased means to maintain said housing against said second slide, a proportional bar having its ends pivotally connected to said first and second slides to transmit the action of said cam means to said housing, fulcrum means positioned on said base to engage said proportional bar and axially slide said housing along said pivot means to guide said cutter in producing a thread of predetermined pitch on said workpiece, a trip pin on said work carrying spindle, a star wheel rotatably mounted on said base and engaged by said trip pin, pressure biased latch means to engage said proportional bar and withhold said roller from said cam means, and trip means actuated by said star wheel to release said latch means.

3. A thread cutting machine comprising a base supporting a work-holding rotary spindle and a rotary cam spindle driven from a common source of power, a cam means on said cam spindle, cutter means supported from said base to move axially and transversely relative to the work-holding rotary spindle, two slides guidably mounted in spaced relation on said base, the first slide having a follower to engage said cam means, the second slide having a pushhead to move said cutter axially, pressure means to bias the axial movement of said cutter means against said pushhead, a proportional bar pivoted to each of said slides, a fulcrum mounted on said base and engaged by said proportional bar to translate through said slides the movement of said cam means to the axial movement of said cutter, a contact bar on said cutter means to engage said cam means, and pressure means to bias the transverse movement of said cutter means to hold said contact bar in engagement with said cam means to control the transverse movement of said cutter means simultaneously with its axial movement.

4. The structure of claim 3 which also includes a block on said cutter means to receive said contact bar, and screw means to move said block and contact bar relative to said cutter means.

5. The structure of claim 3 which also includes jump over lever means pivoted on said base and extending under said bar, a kick out carried by said work holding rotary spindle to engage and raise said lever and in turn said contact bar to lift said cutter means out of working engagement independently of the operation of said cam means.

6. The structure of claim 3 which also includes a hand lever pivoted on said base and extending under said bar to lift said cutter means out of working engagement independently of the operation of said cam means.

7. The structure of claim 3 which also includes a trip means mounted on said base to engage said proportional bar and hold said follower from engaging said cam means.

8. The structure of claim 3 characterized in that said cam means includes an axially faced cam to be engaged by said follower and a dual radially faced cam to control the in and out movements through said contact bar.

9. A machine tool comprising two A frames, a bar attached to and extending between said A frames, two housings suspended from said bar and slidable therealong, clamp means to fix one housing on said bar, bearing means between said bar and said other housing to permit it to move thereon, coaxially aligned rotary spindle means in each housing, a workpiece chuck on the rotary spindle of said one housing and a tool on the rotary spindle of said other housing to operate on work held by said workpiece chuck while said other housing is moved on said bar.

References Cited in the file of this patent

UNITED STATES PATENTS

| | | |
|---|---|---|
| 233,821 | Vinton | Oct. 26, 1880 |
| 760,301 | Berry | May 17, 1904 |
| 1,463,019 | Mooney | July 24, 1923 |
| 1,639,756 | Sundstrand | Aug. 23, 1927 |
| 2,151,688 | Carey | Mar. 28, 1939 |
| 2,712,775 | Wilt | July 12, 1955 |